No. 879,535. PATENTED FEB. 18, 1908.
J. P. FULLILOVE.
AUTOMATIC PARIS GREEN DISTRIBUTER.
APPLICATION FILED MAY 7, 1907.

Witnesses
Jas. H. Blackwood
M. Jones Jr.

Inventor
Jack P. Fullilove
By H. P. Doolittle
Attorney

UNITED STATES PATENT OFFICE.

JACK POPE FULLILOVE, OF SHREVEPORT, LOUISIANA.

AUTOMATIC PARIS-GREEN DISTRIBUTER.

No. 879,535.  Specification of Letters Patent.  Patented Feb. 18, 1908.

Application filed May 7, 1907. Serial No. 372,340.

*To all whom it may concern:*

Be it known that I, JACK POPE FULLILOVE, a citizen of the United States, residing at Shreveport, in the parish of Caddo and State of Louisiana, have invented certain new and useful Improvements in Automatic Paris-Green Distributers, of which the following is a specification.

My invention relates to distributers for paris green or similar poisonous powders to be used on cotton plants and similar growths, and its object is to provide a device of a simple character that may be readily attached to an ordinary plow or cultivator.

Figure 1:
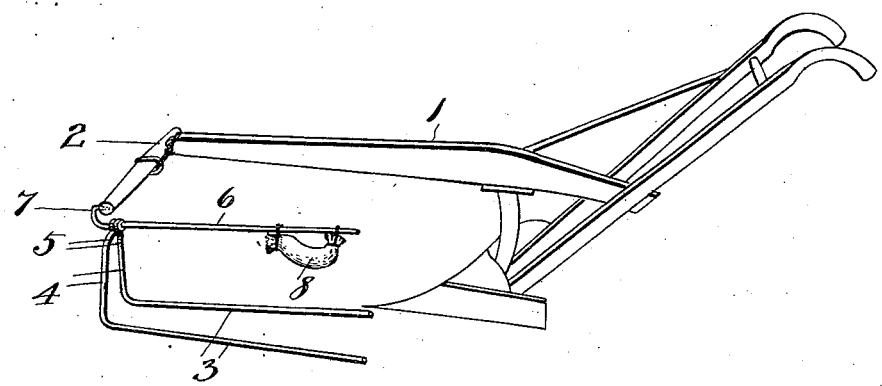
Figure 2:
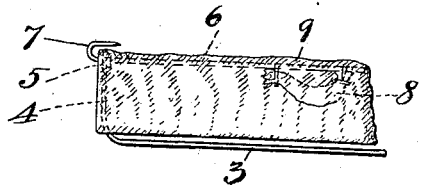

The invention is illustrated in the accompanying drawings in which Figure 1 is a perspective view of the device as applied to a plow and with the hood removed; and Fig. 2, a side view of the device removed from the plow and showing the hood or cover.

Referring to the drawings, 1 is a cultivator plow of usual construction, and 2, the swingletree thereof.

The distributer comprises a frame having two substantially horizontal arms or rods 3, adapted to trail on the ground and diverging outwardly one from the other at the rear end. These arms at their front ends have vertical portions 4 joined by an arch 5. An upper horizontal vibratory bar 6 is secured to the arch 5 and extends rearwardly therefrom. Its front end terminates in a hook or loop 7 adapted to be driven into the swingle-tree near one end thereof so that the distributer will be carried alongside the plow. The rear end of the bar 6 is free, and it is thereby caused to vibrate with the motion of the device as the latter is drawn over the inequalities of the ground.

Loosely supported on the vibratory bar is a container adapted to hold the paris green or other poisonous powder. This container is of such a construction as will permit of the powder being shaken therefrom by the vibration of the distributer and consists preferably of a bag 8 of some loosely woven material having wide meshes through which the powder may be shaken to distribute it over the cotton or other plant to be covered.

It is clear that the vibratory bar 6 will possess a greater degree of vibration near its free end than at its front end where it joins the two supporting arms and that as the device is drawn along the bag will be shaken with a greater or less violence according to the location of the same upon the vibratory bar; hence by adjusting the bag along the bar a greater or less distribution of the paris green or similar substance may be obtained as desired. The device is so attached at the front part of the sliding arms that it will be three or four inches from the ground while the machine is pulled along. The unevenness of the ground will cause the steel bar to vibrate thus shaking the poison out of the bag and dusting the plant therewith.

The hood or cover 9 is hung on the vibratory bar 6 and allowed to depend nearly or entirely to the ground so as to thereby inclose the powder containing bag and prevent the powder from rising and floating away from the area to be covered when it is shaken out from the bag. The device is so attached to the plow that it covers only that portion of the row on which it is desired to distribute the poison.

Having thus described my invention, what I claim is:

1. A distributer consisting of a vibratory frame adapted to slide on the ground, a powder container mounted on said frame and adapted to be shaken by the vibrations thereof to distribute the powder, substantially as described.

2. A distributer having a part adapted to trail on the ground, a vibratory bar connected to said part and a powder container mounted on said bar, substantially as described.

3. A powder distributer attachment for agricultural implements comprising a frame having arms adapted to bear on the ground and having a vibratory bar, a powder container attached to said bar and adapted to be shaken by the vibration of the bar to distribute the powder and means to attach said frame to the implement, substantially as described.

4. A powder distributing device for agricultural implements comprising a frame having arms adapted to bear on the ground and having a vibratory bar, and a powder containing bag adjustably mounted on said bar, substantially as described.

5. A powder distributing device for agricultural implements comprising a vibratory frame adapted to slide on the ground, a powder container secured to said frame, and a hood adapted to cover said frame and container and confine the powder within a certain area, substantially as described.

6. A powder distributer consisting of a frame having two arms adapted to slide on the ground said arms having vertical portions, means to secure said vertical portions to a suitable implement, an arm extending rearwardly from said vertical portions and having a free end whereby it is free to vibrate and a powder bag mounted on said vibratory arm, substantially as described.

In testimony whereof I affix my signature in the presence of two witnesses.

JACK POPE FULLILOVE.

Witnesses:
C. W. CORY,
E. WAYLES BROWNE.